Dec. 17, 1963 L. G. HILKEMEIER ETAL 3,114,478
LIQUID LEVEL MEASURE DEVICE
Filed Aug. 23, 1962 2 Sheets-Sheet 1
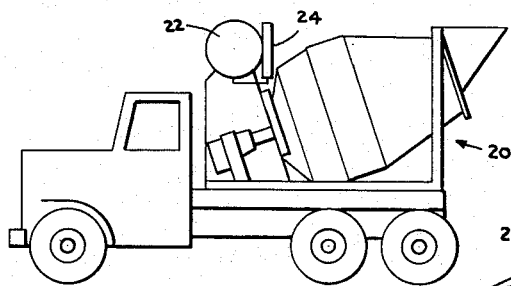
FIG. 1
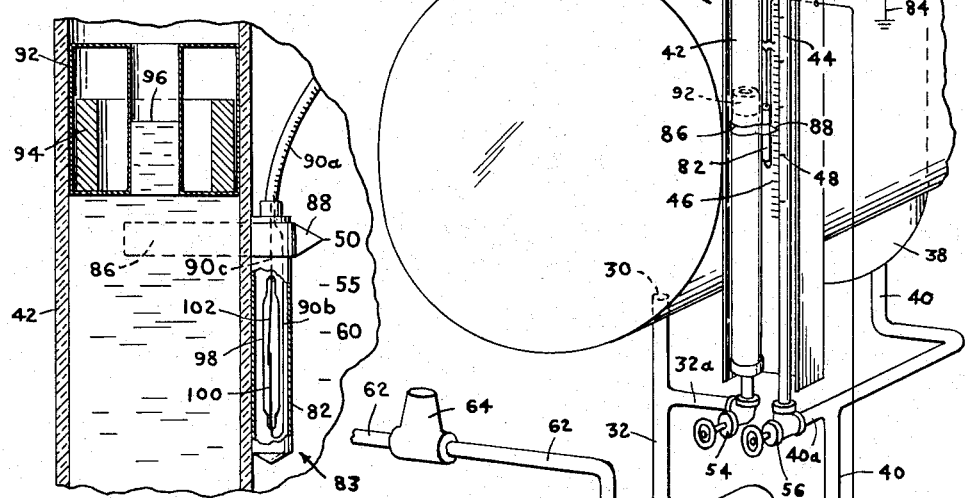
FIG. 2
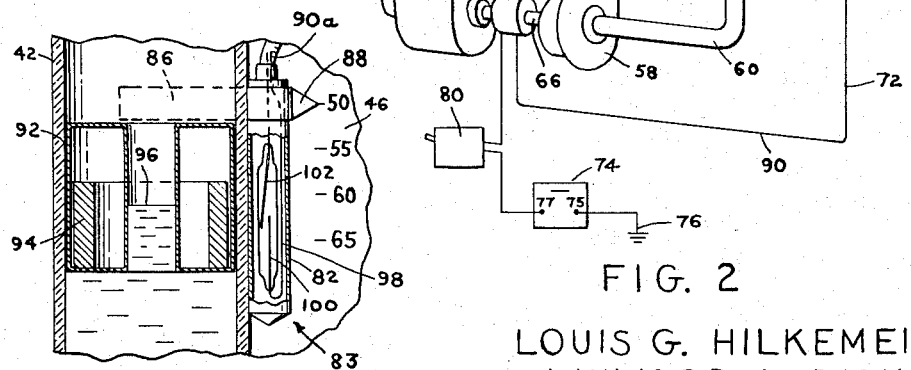
FIG. 3
FIG. 4
LOUIS G. HILKEMEIER
LINWOOD A. PICKLE
INVENTORS
BY Daniel H. Bobis
Atty

LOUIS G. HILKEMEIER
LINWOOD A. PICKLE
INVENTORS

United States Patent Office 3,114,478
Patented Dec. 17, 1963

3,114,478
LIQUID LEVEL MEASURE DEVICE
Louis G. Hilkemeier, Holyoke, and Linwood A. Pickle, South Hadley, Mass., assignors to Worthington Corporation, Harrison, N.J., a corporation of Delaware
Filed Aug. 23, 1962, Ser. No. 218,876
5 Claims. (Cl. 222—17)

This invention relates generally to liquid level measure devices. More particularly the invention relates to liquid level measure devices used to accurately control the amount of liquid discharged from a tank. Heretofore liquid measuring devices commonly in use have been of the siphoned or automatic shut-off valve type. A difficulty with such prior liquid measuring devices has been that they have not been sufficiently accurate or reliable when a specific quantity of liquid was to be discharged from a tank, such as in the mixer art when a certain water cement ratio for concrete is desired.

An object of the invention is to provide an improved liquid level measure device which can be preset to deliver a specific quantity of liquid, which quantity can be determined by selectively positioning an indicator to the desired quantity.

Another object is to provide an improved liquid level measure device which will operate a pump that will be automatically shut-off thereby when the preset quantity of liquid is delivered from the tank.

Another object of this invention is to provide a liquid level measure device of simple design which is reliable and accurate, which is easily applied to existing liquid delivery systems.

Still another object of this invention is to provide an improved liquid level measure device which will be automatically controlled by a float-switch assembly, which assembly will automatically stop the discharge of liquid from the tank on the preset quantity being reached.

Other objects and advantages will be apparent from the following description of several embodiments of the invention and the novel features will be particularly pointed out hereinafter in connection with the pended claims.

In the drawings:

FIGURE 1 is a side elevation of a truck mounted mixer in which the present invention is embodied.

FIGURE 2 is a prospective view of the water system of the mixer including an electric circuit diagram associated therewith and in which the float-switch asembly is disposed outside the tank.

FIGURE 3 is a fragmentary sectional view of the float-switch assembly with the switch in the closed position.

FIGURE 4 is a fragmentary sectional view of the float-switch assembly with the switch in the open position.

Figure 5:
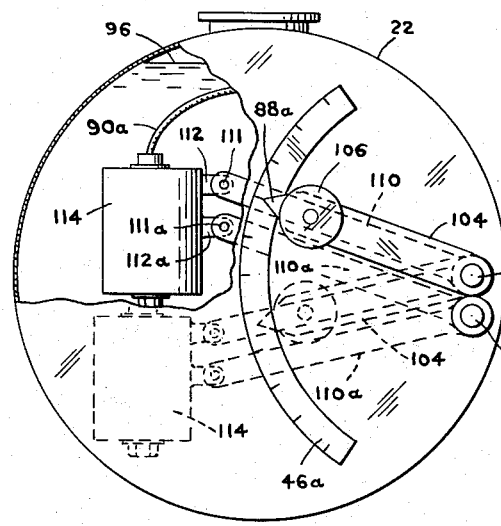
FIGURE 5 is another form of the invention having the float-switch assembly disposed in the tank.

In the embodiment of the invention illustrated in FIGURES 1 to 4 the novel liquid level measure device is shown in FIGURE 1 for use with a conventional truck mounted mixer 20 having a main tank 22 and a gauge assembly 24 which is associated with the tank 22 and indicates the level of the liquid therein. The components and operation of the mixer, other than the water system, will not be described as they do not form a part of the present invention. It is understood while this invention has been shown embodied for use with a mixer it may be used with any apparatus that requires delivery of an exact and accurately measured quantity of fluid.

The main tank 22 as illustrated in FIGURE 2 has an inlet 26 which is normally closed by a removable filter cap 28. Outlet 30 of tank 22 has an outlet 30 suitably positioned and connected to line 32 which leads to a conventional selector valve 34. Valve 34 can be selectively positioned by moving the handle 36 so that liquid may be delivered from either tank 22 or flush tank 38 by line 40, or it can be shut off to prevent siphoning.

The level of liquid in tank 22 and tank 38 is indicated by the level of liquid in the gauges 42 and 44, respectively, the liquid being delivered by lines 32a and 40a. Gauges 42 and 44 have individual calibrations 46 and 48 which correspond to the volume discharged from their respective tanks. Also, gauges 42 and 44 each have vent plug 50 and 52 respectively. The flow in line 32a and 40a is controlled by individual valves 54 and 56 respectively.

The liquid is delivered from either tank 22 or tank 38 by operation of pump 58 and passes from valve 34 through line 60 thereto. Fluid is discharged from pump 58 into line 62 where it will pass to the mixer. A check valve 64 is disposed in line 62 to prevent the liquid from backing up.

Pump 58 has an impeller (not shown) mounted on shaft 66 within pump 58. Outwardly of pump 58, shaft 66 passes into and is controlled by an electric clutch 68 in combination with motor 70. The motor 70 and electric clutch 68 is in turn energized by a suitable electric circuit 72.

Electric circuit 72 has a suitable source of power such as battery 74, terminal 75 of which is connected to ground 76 with the other terminal 77 connected to electric clutch 68. Disposed in a convenient place, such as the truck cab and connected between clutch 68 and terminal 77 is a normally open manual switch 80. The lead from the electric clutch 68 goes to a normally closed magnetically sensitive switch 82 adjacent gauge 42 and passes therefrom to ground 84 to complete the circuit. Switch 82 is connected to retaining clip 86 and is part of the float-switch assembly 83 the other part of which is float 92 which has a magnet 94 disposed therein for purposes hereinafter described. Retaining clip 86 has an indicator 88 disposed thereon in juxtaposition to calibration 46. Electric circuit 72 is made up of conduit 90 which will connect the various components thereof. Further, there is sufficient conduit to allow switch 82 to be selectively positioned anywhere along gauge 42 and for convenience the leads may be contained in a two lead flexible conduit 90a.

The operator sets the indicator 88 to a position corresponding to the quantity of liquid to be delivered from tank 22 and sets valve 34 to communicate line 32 and line 60. Thereafter he closes switch 80 and the electric clutch and motor turn shaft 66 to operate pump 58 which pumps the liquid from tank 22. The level of the liquid in the tank 22 and gauge 42 is the same so that when the preset quantity has been discharged float 92 is adjacent switch 82 and magnet 94 in float 92 will cause switch 82 to open thus breaking circuit 72 and stopping pump 58 at the desired time.

FIGURES 3 and 4 show the principle of this operation. After tank 22 has been filled and indicator 88 set, a manual switch 80 is turned to the on position causing pump 58 to operate to deliver fluid liquid from tank 22. The float 92 is annular and partially submerged as indicated by the liquid level 96. Switch 82 is hermetically sealed and has an armature 98 therein. Enclosed in the armature is a fixed blade 100 and a movable blade 102 which is normally in contact with the fixed blade 100. Blades 100 and 102 are connected to wire 90b and 90c respectively which are suitably disposed in a two lead conduit 90a. Blade 102 is magnetically sensitive so that when the level of the liquid 96 in gauge 42 reaches a position corresponding to the preset value the magnetic field set up by magnet 94 will attract blade 102 causing it to break contact with blade 100 thus breaking the circuit and causing the pumping 58 to stop at the exact quantity of fluid desired to be delivered from tank 22.

In the present illustration liquid could be delivered from tank 38 by placing switch 82 in a position remote from the magnetic field of magnet 94 so that it will remain closed. Valve 34 is set to communicate line 40 and line 60. Thereafter switch 80 will control the operation and on closing it pump 58 will operate to pump liquid from tank 38. After the desired quantity has been discharged from tank 38 switch 80 is again opened thus breaking the circuit and stopping pump 58.

In the embodiment shown in FIGURES 5 to 10 the electric circuit 72 and associated connected components thereof therewith are formed as explained in connection with FIGURES 1 to 4 but instead of using the float-switch assembly 83 which was outside the tank 22, the float-switch assembly 83a is used inside tank 22. Further the calibration 46a is placed directly on the tank but serves the same purpose as did calibration 46, that of indicating the corresponding quantities of liquid in tank 22. Indicator 88a is formed on arm 104 as shown in FIGURE 5 in juxtaposition to calibration 46a. Arm 104 is pivotally connected in a leak-proof manner to tank 22, as at 108, and has a handle 106 connected near its other end.

Figure 6:
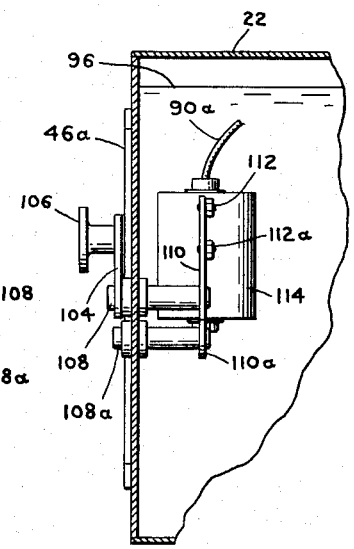
FIGURE 6 is a fragmentary side view partly in section, of FIGURE 5.

A parallelogram is formed inside tank 22 as shown in FIGURES 5 and 6 with the top link 110 thereof pivotally connected at 108 in a fixed parallel relationship with arm 104 so that when arm 104 is rotated link 110 will be rotated an equal amount. Link 110 extends from connection 108 and is rotatably connected at 111 to projection 112. Projection 112a is vertically below projection 112 and similarly connected at 111a to link 110a which has its other end pivotally connected at 108a. Connection 108a is spaced from and vertically below connection 108 a distance equal to that between projection 112 and 112a. Accordingly, connections 111 and 111a will remain disposed in a vertical plane regardless of the position of arm 104. This is illustrated in FIGURE 5 by the dotted lines showing arm 104 in a lower position.

Figure 7:
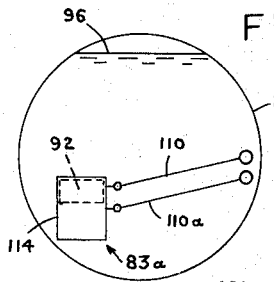
FIGURE 7 is a diagrammatic view showing the float-switch assembly in which the switch will be in the closed position.
Figure 8:
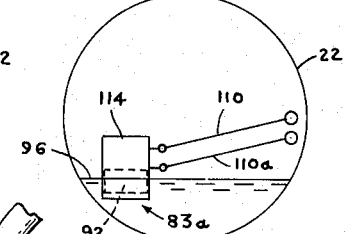
FIGURE 8 is a diagramatic view showing the float-switch assembly in which the switch will be in the open position.

Projections 112 and 112a extend from protective housing 114 in which is disposed float-switch assembly 83a the operation of which is similar to that previously described hereinbefore for float-switch assembly 83. A diagrammatic representation of the operation of float-switch assembly 83a is shown in FIGURES 7 and 8. When the protective housing is submerged the float 92 will remain at the upper end of housing 114 and the magnetic field of magnet 94 will be remote from the magnetic sensitive blades 102a of switch 82a however after the liquid has been pumped from the tank the liquid level 96 on reaching the level corresponding to the amount indicated by the indicator 88a the float 92 will assume a position in the housing which is adjacent the magnetic sensitive blades 102a thus causing the circuit to be opened and stopping the pump in the same manner as previously described herein above.

Figure 10:
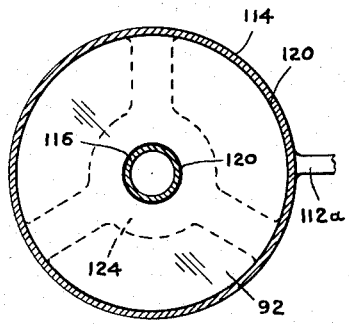
FIGURE 10 is a view taken in the direction of line 10—10 of FIGURE 9.
Figure 9:
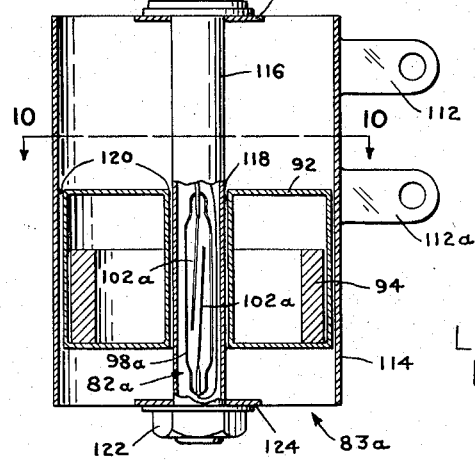
FIGURE 9 is a sectional view of the float-switch assembly of FIGURE 5.

FIGURE 9 illustrates a float-switch assembly 83a disposed in protective housing 114. Annular float 92 has an annular magnet 94 therein and is disposed with stem 116 passing through the open space 118 thereof. There is sufficient clearances as at 120 between the float 92 and both the stem 116 and the housing 114 so that the float may assume a position coresponding to the level of the liquid in tank 22 without binding against either stem 116 or housing 114. Disposed in stem 116 is switch 82a which is similar in all respects to switch 82 except that both blades 102a are magnetically sensitive and movable so that when the magnet 94 of float 92 reaches a position adjacent the blades 102a both will be moved outwardly from their point of connection to break the circuit. Stem 116 has threaded end sections and is positioned within the housing by nuts 122 which are disposed outwardly of web members 124. Web members 124 also serve to set the outer boundaries of the movement of float 92 thus when the housing 114 is completely submerged in the liquid of tank 22 float 92 will assume the position shown in FIGURE 7. Web member 124 is shown in FIGURE 10 and has openings therein to allow the liquid to pass freely through housing 114 so that float 92 can reflect a true indication of the level of the liquid in tank 22 to insure proper operation of the float-switch assembly 83a.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. A liquid level measure device comprising:
    (*a*) a tank for the storage of liquid having inlet means and outlet means therein,
    (*b*) a pump connected to said outlet means,
    (*c*) an electric clutch operatively associated with said pump and adapted to operate said pump,
    (*d*) electrical conduit means connected in series to said electrical clutch and to a source of electrical power,
    (*e*) line means connected to the discharge of said pump to deliver the liquid to a predetermined place,
    (*f*) a check valve means disposed in said line means to prevent the liquid from flowing by static head in said line means before said pump becomes operative whereby on operation of said pump said valve means will be opened by the pressurized liquid from said pump,
    (*g*) a calibration indicator means connected to said tank and adapted to preset the quantity of liquid to be pumped from said tank,
    (*h*) a float-switch in floating association with the liquid in said tank and mounted in association with said indicator means,
    (*i*) said float-switch in operative association with said electrical conduit means and in a normally closed position and adapted to open the circuit on reaching the preset liquid level,
    (*j*) a manual switch means connected in series to said electrical conduit means in a normally open position and adapted to close the circuit to operate said electric clutch whereby said pump will become operational and deliver a preset quantity of liquid from said tank thereby causing said float-switch to open the circuit on reaching the level of the indicator means and stopping said pump.

2. The combination claimed in claim 1 wherein:
    (*a*) means connecting said indicator means and said float-switch means whereby changing the level of said indicator means will close the circuit connection of said float-switch and on said float-switch and said indicator means returning to the same level said float-switch to open thereby breaking the circuit connection.

3. A liquid level measure device for pumping exact quantities of liquid from a tank whose delivery line is connected in series with a pump comprising:
(a) indicator means associated with the tank and adapted to be selectively positioned corresponding to a predetermined quantity of liquid,
(b) electrical means operatively associated with the pump,
(c) a switch in said electric means associated with the indicator means and disposed in a normally closed position,
(d) said switch sensitive to magnetism,
(e) a float having magnets therein in spaced relation with said switch whereby on operation of said pump the liquid in the tank will be pumped out lowering the float until the float is in proximity with the switch and the magnets thereof causing the switch to open thus stopping the pump.

4. The combination claimed in claim 3 wherein said float and said switch are disposed in a protective housing having top and bottom openings therein.

5. The combination claimed in claim 4 wherein linkage means connect said housing and said indicator means whereby on setting said indicator means said housing will be moved to a corresponding position.

References Cited in the file of this patent
UNITED STATES PATENTS

| | | |
|---|---|---|
| 684,893 | Whitfield | Oct. 22, 1901 |
| 1,346,898 | Kingsbury | July 20, 1920 |
| 1,699,562 | Courtioux | Jan. 22, 1929 |
| 1,820,981 | Le Fever | Sept. 1, 1931 |
| 1,981,160 | Baldwin | Nov. 20, 1934 |
| 2,243,188 | Biach | May 27, 1941 |
| 2,472,389 | Von Stoeser | June 7, 1949 |
| 2,646,068 | Gullas | July 21, 1953 |
| 2,893,595 | Hebard et al. | July 7, 1959 |
| 2,924,234 | Wilson | Feb. 9, 1960 |